United States Patent
Kimura et al.

(10) Patent No.: US 6,493,459 B2
(45) Date of Patent: *Dec. 10, 2002

(54) IMAGE READING APPARATUS

(75) Inventors: Toshihito Kimura; Hidemasa Sato, both of Kanagawa-ken (JP)

(73) Assignee: Fuji Photo Film Co., Ltd., Kanagawa-Ken (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/185,032

(22) Filed: Nov. 3, 1998

(65) Prior Publication Data

US 2002/0097899 A1 Jul. 25, 2002

(30) Foreign Application Priority Data

Nov. 6, 1997  (JP) ............................................. 9-304020

(51) Int. Cl.⁷ .................................................. G06K 9/00
(52) U.S. Cl. ...................... 382/129; 250/586; 250/458.1
(58) Field of Search ................................ 382/129, 128; 385/38, 901, 115; 250/586, 458.1; 204/452; 435/6; 436/172; 356/344, 300

(56) References Cited

U.S. PATENT DOCUMENTS

| | | | | | |
|---|---|---|---|---|---|
| 4,852,050 A | * | 7/1989 | Shiraishi et al. | ............ | 364/414 |
| 4,884,200 A | * | 11/1989 | Kimura et al. | ............... | 364/413 |
| 4,888,695 A | * | 12/1989 | Shiraishi et al. | ............ | 364/413 |
| 5,108,179 A | * | 4/1992 | Myers | ........................ | 356/344 |
| 5,281,517 A | * | 1/1994 | Bacus et al. | .................... | 435/6 |
| 5,434,663 A | * | 7/1995 | Maule | ......................... | 356/300 |
| 5,633,724 A | * | 5/1997 | King et al. | .................. | 356/445 |
| 5,736,410 A | * | 4/1998 | Zarling et al. | ............... | 436/172 |
| 5,741,411 A | * | 4/1998 | Yeung et al. | ................ | 204/452 |
| 5,790,727 A | * | 8/1998 | Dhawal et al. | ................ | 358/38 |

FOREIGN PATENT DOCUMENTS

| | | |
|---|---|---|
| JP | 4115140 A | 4/1992 |
| JP | 6341955 A | 12/1994 |
| JP | 7271962 A | 10/1995 |
| JP | 9105738 A | 4/1997 |
| WO | WO 94/16313 | 7/1994 |

* cited by examiner

*Primary Examiner*—Leo Boudreau
*Assistant Examiner*—Barry Choobin
(74) *Attorney, Agent, or Firm*—Sughrue Mion, PLLC

(57) ABSTRACT

An image reading apparatus includes a laser stimulating ray source for emitting a laser beam, a base made of transparent material and bearing thereon an image carrier which carries a fluorescence image formed by a fluorescent substance which can be excited and can release fluorescent light in response to irradiation by the laser beam, a laser beam scaner for upwardly scanning a bottom surface of the image carrier borne on the base with the laser beam emitted from the laser stimulating ray source through the base, a light detector provided below the base for photoelectrically detecting fluorescent light released from the image carrier, and an image carrier receiving portion provided on the base and containing a substance having a refractive index larger than that of air and closer to that of the image carrier than that of air, the substance filling gaps between the image carrier and the base. According to the thus constituted image reading apparatus, it is possible to accurately read the image regardless of the kind of image carrier.

22 Claims, 4 Drawing Sheets

IMAGE READING APPARATUS

BACKGROUND OF THE INVENTION

The present invention relates to an image reading apparatus and, particularly to such an apparatus which can be used in a fluorescence detecting system and can accurately read a fluorescence image.

DESCRIPTION OF THE PRIOR ART

A fluorescence detecting system using a fluorescent substance as a labeling substance is known. According to this system, it is possible to study a genetic sequence, the expression level of a gene and the metabolism, absorption, excretion path and state of a substance introduced into a test animal and to effect the separation or identification of protein or the estimation of the molecular weight or properties of protein or the like by the steps of labeling a specimen using the fluorescent substance, irradiating the specimen with radiation, exciting the fluorescent substance contained in the specimen and detecting the released fluorescent light. For example, this system can perform a process including the steps of electrophoresing a plurality of DNA fragments on the gel support after a fluorescent dye was added to a solution containing a plurality of DNA fragments to be electrophoresed or distributing a plurality of DNA fragments on a gel support containing fluorescent dye or dipping a gel support on which a plurality of DNA fragments have been electrophoresed in a solution containing fluorescent dye, thereby labeling the electrophoresed DNA fragments, exciting the fluorescent dye by a stimulating ray to cause it to release a fluorescent light, detecting the released fluorescent light to produce an image and detecting the distribution of the DNA fragments on the gel support. This system also performs a process including the steps of electrophoresing a plurality of DNA fragments on a gel support, denaturing the DNA fragments, transferring at least a part of the denatured DNA fragments onto a transfer support such as a nitrocellulose support by the Southern-blotting method, hybridizing a probe prepared by labeling target DNA and DNA or RNA complementary thereto with the denatured DNA fragments, thereby selectively labeling only DNA fragments complementary to the probe DNA or probe RNA, exciting the fluorescent dye by a stimulating ray to cause it to release a fluorescent light, detecting the fluorescent light to produce an image and detecting the distribution of the target DNA fragments on the transfer support. This system can further perform a process including the steps of preparing a DNA probe complementary to DNA containing a target gene labeled by a labeling substance, hybridizing it with DNA on a transfer support, combining an enzyme with complementary DNA labeled by a labeling substance, causing the enzyme to contact a fluorescent substance, transforming the fluorescent substrate to a fluorescent substance having a property to release fluorescent light, exciting the thus produced fluorescent substance by a stimulating ray to release fluorescent light, detecting the fluorescent light to produce an image and detecting the distribution of the target DNA fragment on the transfer support. This fluorescent detecting system is advantageous in that a genetic sequence or the like can be easily detected without using a radioactive substance.

Since the gel support often used in such a fluorescence detecting system contains much water and is significantly soft, the surfaces of the gel support are not usually flat and distribution of water attached to the surfaces is not uniform. Due to the uneven (not flat) surfaces of the gel support and the uneven distribution of water on the surfaces of the gel support, it is difficult to accurately read the fluorescence image from the gel support when the detection of the fluorescent light released from the fluorescent substrate is performed by downwardly irradiating the top surface of the gel support with the stimulating light.

Therefore, there has been proposed an image reading apparatus in which an image carrier, such as a gel support or a transfer support, is placed on a flat base made of transparent material such as glass or the like to flatten its bottom surface and to scan the flattened bottom surface thereof through the flat base by a stimulating ray such as a laser beam to excite the fluorescent substance contained in the image carrier and to release fluorescent light. The fluorescent light thus released is photoelectrically detected by detecting means provided below the base.

The above-described fluorescence detecting system may perform a process including the steps of labeling specimens with a fluorescent substance, putting the labeled specimens into wells of a micro-plate disclosed in, for example, Japanese Laid-Open Publication No.6-186339, projecting a stimulating ray onto the specimen and detecting fluorescent light from the fluorescent substance. In this case, since the volume of the specimens tends to be different between different wells the vertical position from which the fluorescent light is released may differ among the wells. As a result, it may be meaningless to quantitatively compare the intensity of the fluorescent light from one well with that from the other wells and to effect quantitative analysis of the fluorescent images from the micro-plate. Therefore, it is desirable that the fluorescence detection from the micro-plate also include the steps of placing the micro-plate on the base made of transparent material such as glass, irradiating the specimens received in the wells with the stimulating light from the lower side of the micro-plate through the base to excite the fluorescent substance contained in the specimens and to release the fluorescent light from the fluorescent substance, and photoelectrically detecting the released light by the detecting means provided below the base.

However, even if the image carrier is placed on the flat base, it is difficult to make the bottom surface of the image carrier contacting the base completely flat. Thus, gaps filled with air and having uneven thickness (vertical length) are often formed between the bottom surface of the image carrier and the top surface (floor) of the base.

Since the stimulating ray directed onto the image carrier from the base is refracted by the gaps, which usually have uneven thickness, the path of the stimulating ray irregularly shifts and its diameter irregularly varies depending on the thickness of the individual gaps.

Thus, the position actually irradiated by the stimulating ray shifts from the position intended to be irradiated by a distance depending on the thickness of the gap concerned. As pointed out above, the thickness of the gaps is uneven and therefore, the distance between the position actually irradiated and the position intended to be irradiated is not constant in the same image carrier. Further, due to the change in beam diameter, the irradiation power density is not constant in the same image carrier. Accordingly, distortion and irregularity appear in the produced fluorescence image.

The stimulating ray is reflected by both the image carrier and the flat base. The stimulating ray reflected by the image carrier interferes with the stimulating ray reflected by the flat base. Therefore, if the thickness of the gaps is not uniform, the degree of the interference between two reflected lights is different in the same image carrier, resulting in irregular interference in the image carrier.

Such distortion and irregularity are serious problems especially in image reading from a micro-plate. Specifically, the bottom surface of the micro-plate or the surface facing the base when the image carried on the micro-plate is read may be not flat but have multiple recesses or grooves. Therefore, when the fluorescence images of the specimens labeled with the fluorescent substance and received in the wells of the micro-plate are to be read from the base side, since the thickness of the air presenting in the recesses or grooves between the micro-plate and the base is not constant, distortion and irregularity appear in the produced image and the accuracy in image reading is degraded.

SUMMARY OF THE INVENTION

It is therefore an object of the present invention to provide an image reading apparatus which can be used in a fluorescence detecting system and can accurately read the image regardless of the kind of image carrier.

The above and other objects of the present invention can be accomplished by an image reading apparatus comprising at least one laser stimulating ray source for emitting a laser beam, a base made of transparent material and bearing thereon an image carrier which carries a fluorescence image formed by a fluorescent substance which can be excited and release fluorescent light in response to irradiation by the laser beam, a laser beam scanning means for upwardly scanning a bottom surface of the image carrier borne on the base with the laser beam emitted from the laser stimulating ray source through the base, light detecting means provided below the base for photoelectrically detecting fluorescent light released from the image carrier and an image carrier receiving portion provided on the base and containing a substance having a refractive index larger than that of air and closer to that of the image carrier than that of air, the substance filling gaps between the image carrier and the base.

In a preferred aspect of the present invention, the substance having a refractive index larger than that of air and closer to that of the image carrier than that of air is a liquid.

In another preferred aspect of the present invention, the substance having a refractive index larger than that of air is water.

In a further aspect of the present invention, the image carrier comprises a micro-plate made of transparent material and having a plurality of wells for receiving specimens labeled with a fluorescent substance.

In a further aspect of the present invention, the image carrier comprises a gel support including a specimen labeled with a fluorescent substance.

In a further aspect of the present invention, the base is provided with retaining means for fixing the image carrier.

In a further aspect of the present invention, the at least one laser stimulating ray source is a laser stimulating ray source for emitting a laser beam having a wavelength between 470 nm and 480 nm.

In a further aspect of the present invention, the at least one laser stimulating ray source is a laser stimulating ray source for emitting a laser beam having a wavelength of 633 nm or 635 nm.

In a further aspect of the present invention, the at least one laser stimulating ray source is a laser stimulating ray source for emitting a laser beam having a wavelength between 530 nm and 540 nm.

As termed with respect to the present invention, the phrase "the image carrier carries an image of a fluorescent substance" includes the case where the image carrier carries an image of a specimen labeled with a labeling substance and the case where the image carrier carries an image of a fluorescent substance obtained by combining an enzyme with a specimen labeled with a labeling substance, causing the enzyme to contact a fluorescent substrate and transforming the fluorescent substrate to a fluorescent substance. In the present invention, the term "image carrier" includes an object such as a gel support which contains a specimen labeled with a fluorescent substance, an object such as a micro-plate holding a specimen labeled with a fluorescent substance in a well or an object such as a piece of gel attached to a glass plate.

In the present invention, the fluorescent dye employed for labeling the specimen to form an image to be carried in an image carrier and read by stimulating it using a laser beam having a wavelength between 470 nm and 480 nm, may be any type of fluorescent dye insofar as it can be stimulated by a laser beam having a wavelength between 470 nm and 480 nm. However, preferably employed fluorescent substances stimulable by a laser beam having a wavelength between 470 nm and 480 nm include Fluorescein (C.I. No. 45350), Fluorescein-X indicated by the structural formula (1) shown below, YOYO-1 indicated by the structural formula (2), TOTO-1 indicated by the structural formula (3), YO-PRO-1 indicated by the structural formula (4), CY-3 (registered trademark) indicated by the structural formula (5), Nile Red indicated by the structural formula (6), BCECF indicated by the structural formula (7), Rhodamine 6G (C.I. No. 45160), Acridine Orange (C.I. No. 46005), SYBR Green ($C_2H_6OS$), Quantum Red, R-Phycoerytlmn, Red 613, Red 670, Fluor X, FAM, AttoPhos, Bodipy phosphatidylcholine, SNAFL, Calcium Green, Fura Red, Fluo 3, AllPro, NBD phosphoethanolamine and the like.

In the present invention, the fluorescent substance employed for labeling a specimen to form an image to be carried in an image carrier and read by stimulating it using a laser beam having a wavelength of 633 nm or 635 nm may be any type of fluorescent dye insofar as it can be stimulated by a laser beam having a wavelength of 633 nm or 635 nm. However, preferably employed fluorescent substances stimulable by a laser beam having a wavelength of 633 nm or 635 nm include CY-5 (registered trademark) indicated by the structural formula (8), Allphycocyanin and the like.

Moreover, in the present invention, the fluorescent substance employed for labeling a specimen to form an image to be carried in an image carrier and read by stimulating it using a laser beam having a wavelength between 530 nm and 540 nm may be any type of fluorescent dye insofar as it can be stimulated by a laser beam having a wavelength between 530 nm and 540 nm. However, preferably employed fluorescent substances stimulable by a laser beam having a wavelength between 530 nm and 540 nm include CY-3 (registered trademark) indicated by the structural formula (5), Rhodamine 6G (C.I. No. 45160), Rhodamine B (C.I. No45170), Ethidium Bromide indicated by the structural formula (9), Texas Red indicated by the structural formula (10), Propidium Iodide indicated by the structural formula (11), POPO-3 indicated by the structural formula (12), Red 613, Red 670, Carboxyrhodamine (R6G), R-Phycoeryhthrin, Quantum Red, JOE, HEX, Ethidium homodimer, Lissamine rhodamine B peptide and the like.

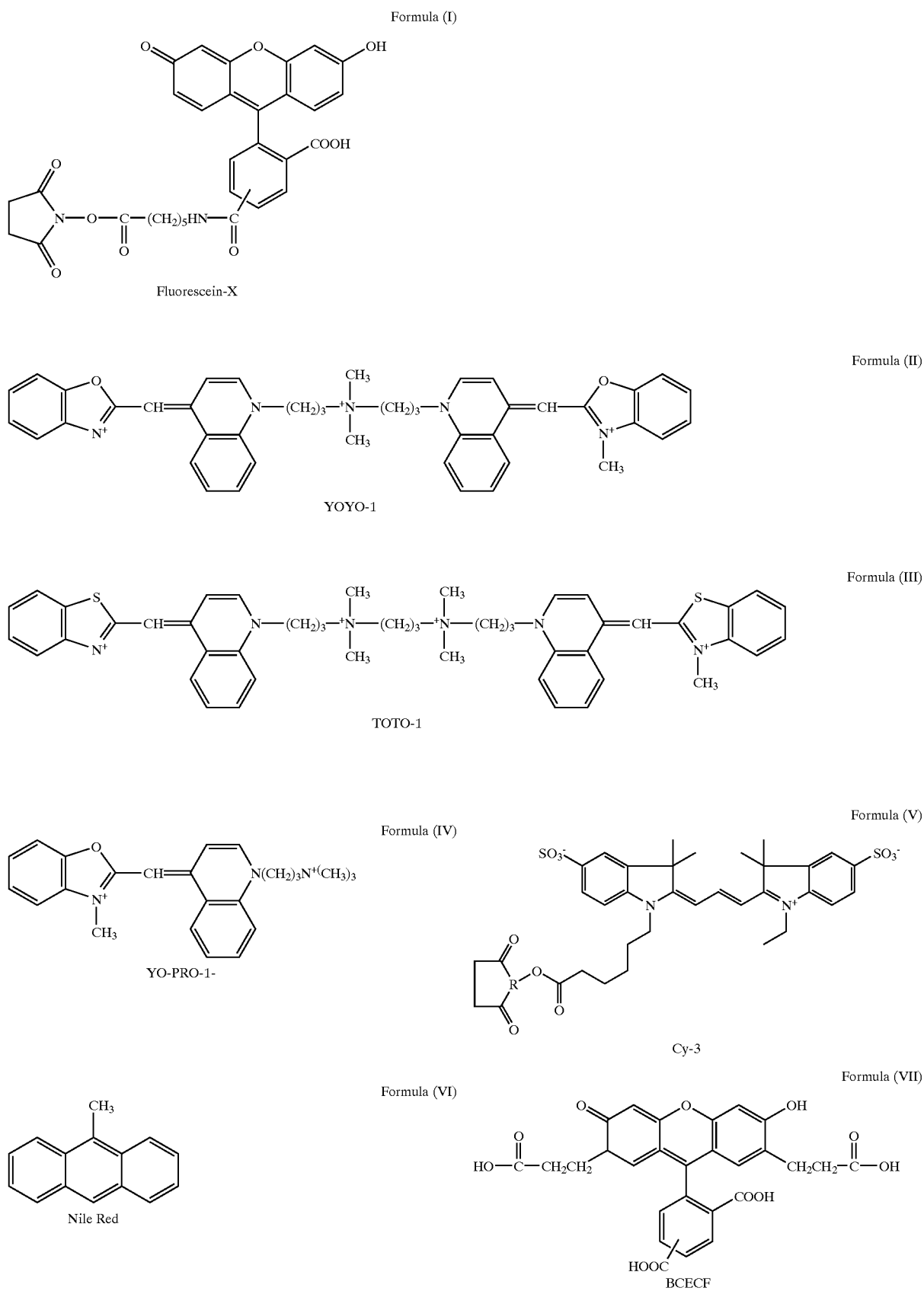

Formula (VIII)

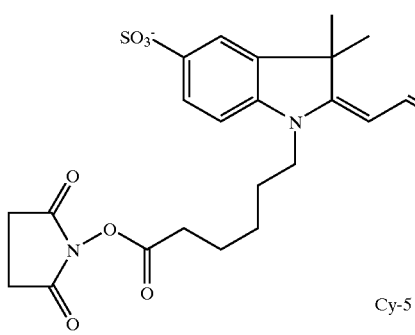

Cy-5

Formula (IX)

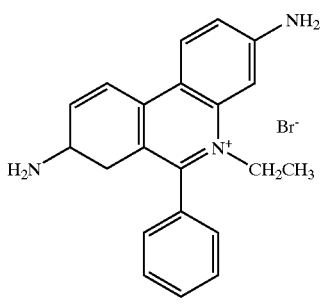

Ethidium Bromide

Formula (X)

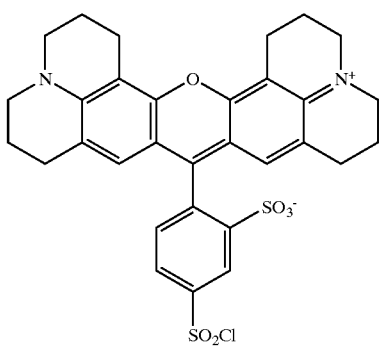

Texas-Red

Formula (XI)

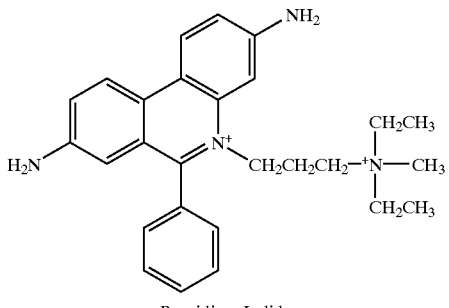

Propidium Iodide

Formula (XII)

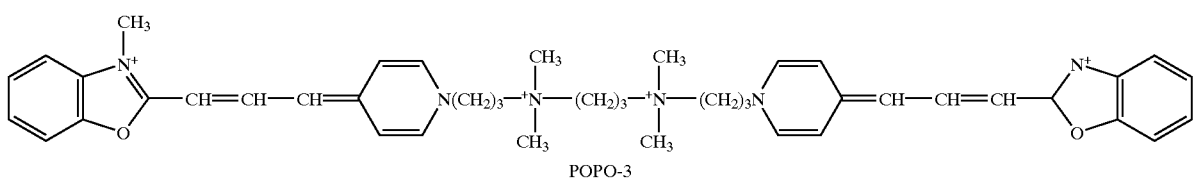

POPO-3

DETAILED DESCRIPTION OF THE PREFERRED EMBODIMENT

Figure 1:
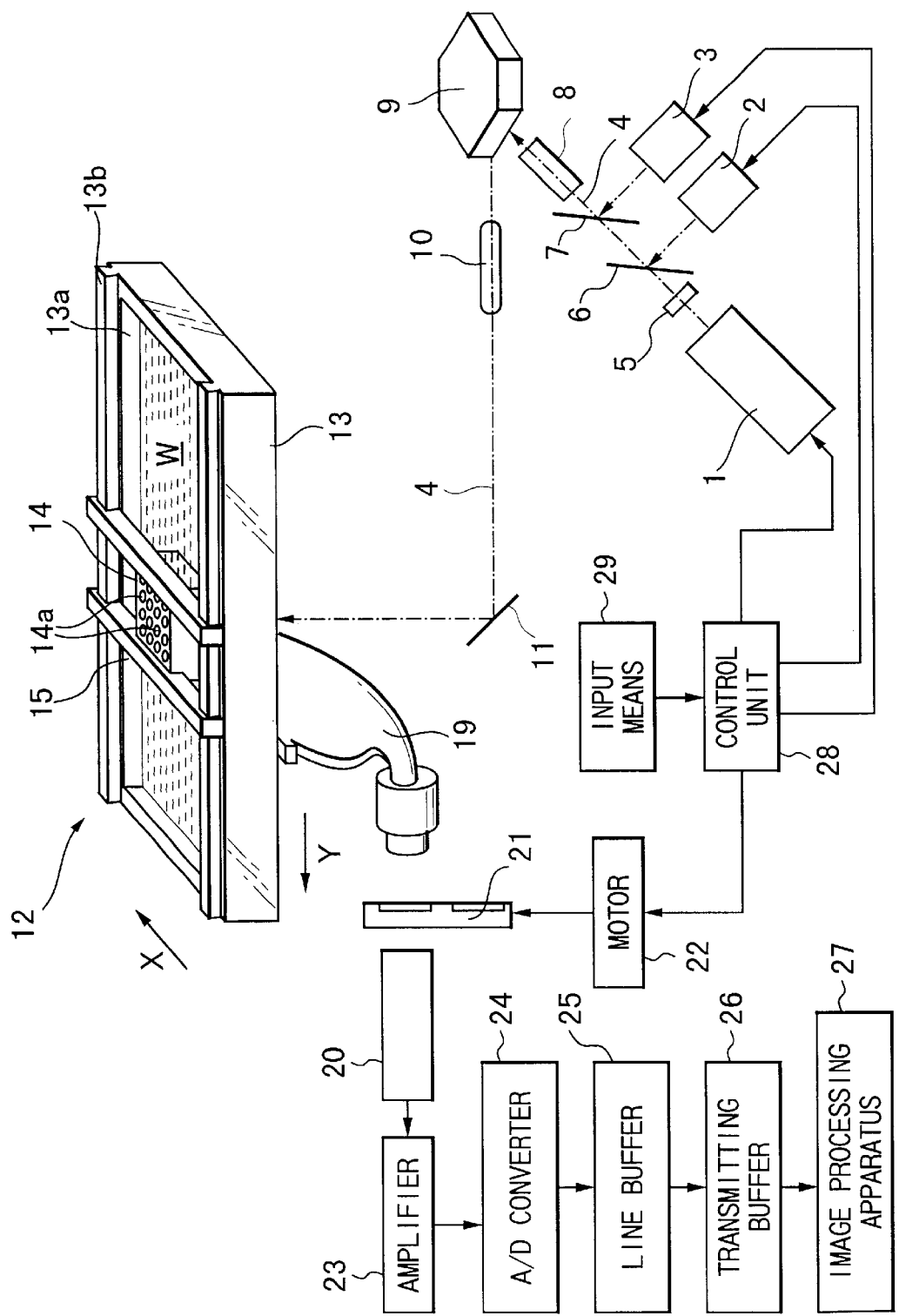
FIG. 1 is a schematic perspective view showing an image reading apparatus which is a preferred embodiment of the present invention.

As shown in FIG. 1, an image reading apparatus includes a first laser stimulating ray source 1 for emitting a laser beam having a wavelength of 633 nm, a second laser stimulating ray source 2 for emitting a laser beam having a wavelength of 532 nm and a third laser stimulating ray source 3 for emitting a laser beam having a wavelength of 473 nm. In this embodiment, the first laser stimulating ray source 1 constituted by a He—Ne laser beam source and the second laser stimulating ray source 2 and the third laser stimulating ray source 3 are constituted by a second harmonic generation element.

Laser beam 4 emitted from the first laser stimulating source 1 passes through a filter 5, thereby cutting light in a wavelength region corresponding to a wavelength region of fluorescent light or stimulated emission released or emitted from a fluorescent substance or a stimulable phosphor sheet in response to the stimulation by the laser beam 4 having a wavelength of 633 nm. A first dichroic mirror 6 for transmitting light having a wavelength of 633 nm but reflecting light having a wavelength of 532 nm and a second dichroic mirror 7 for transmitting light having a wavelength equal to and longer than 532 nm but reflecting light having a wavelength of 473 nm are provided in an optical path of the laser beam 4 emitted from the first laser stimulating ray source 1. The laser beam 4 emitted from the first laser stimulating ray source 1 and transmitted through the filter 5 passes through the first dichroic mirror 6 and the second dichroic mirror 7. The laser beam 4 emitted from the second laser stimulating ray source 2 is reflected by the first dichroic mirror 6, thereby changing its direction by 90 degrees, and passes through the second dichroic mirror 7. The laser beam 4 emitted from the third laser stimulating ray source 3 is reflected by the second dichroic mirror 7, thereby changing its direction by 90 degrees. The laser beam 4 emitted from the selected one of the first laser stimulating ray source 1, the second laser stimulating ray source 2 and the third laser stimulating ray source 3 then enters the beam expander 8. The beam diameter of the laser beam 4 is accurately adjusted by the beam expander 8 and impinges on a polygon mirror 9. The laser beam 4 deflected by the polygon mirror 9 passes through fθ lens 10 and is reflected by a reflecting mirror 11, thereby upwardly entering a bottom surface of an image carrier unit 12. The fθlens 10 ensures that the image carrier unit 12 is always scanned with the laser beam 4 at a uniform beam speed when it is scanned with the laser beam 4 in a direction indicated by X, namely, the main scanning direction.

As shown in FIG. 1, the image carrier unit 12 comprises a base 13 made of transparent glass and an image carrier 14 borne by the base 13. In this embodiment, the image carrier 14 is a micro-plate 14. At a top portion of the base is provided an image carrier receiving portion 13a for receiving an image carrier such as the micro-plate 14. In this embodiment, the receiving portion 13a is a recess having a rectangular parallelepiped form and constructed to hold a liquid such as water therein.

Figure 2:
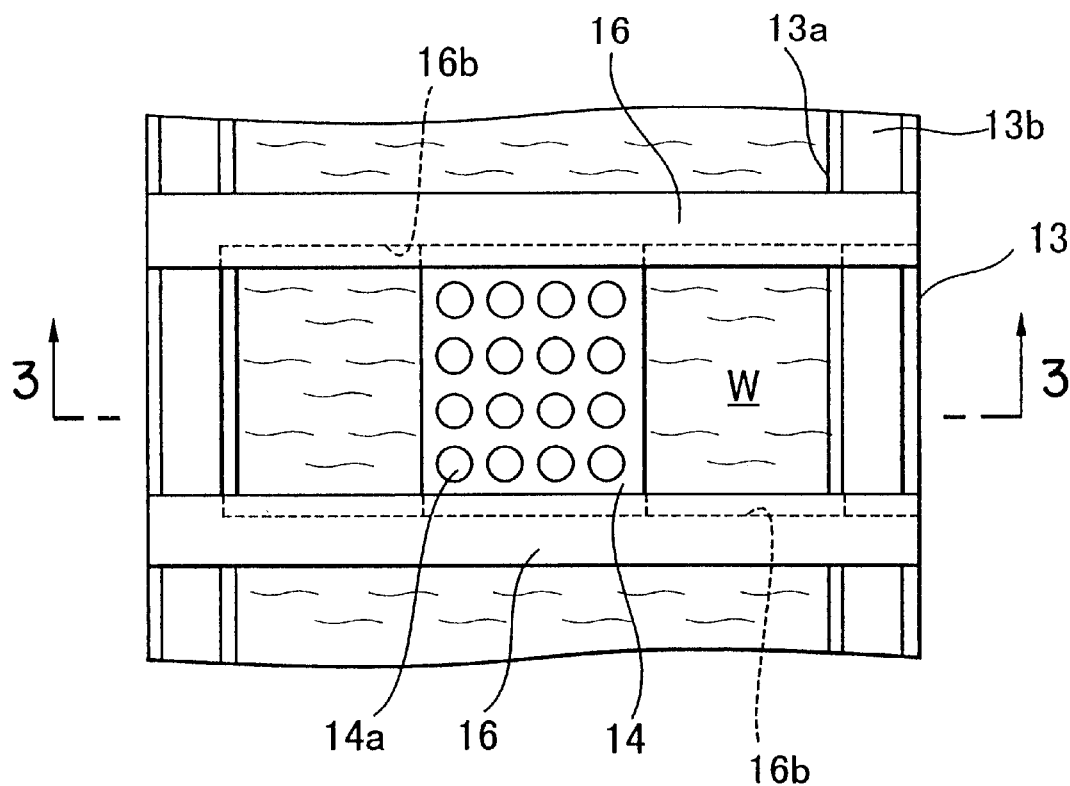
FIG. 2 is a partial plan view showing a base holding a micro-plate in its recess.
Figure 3:
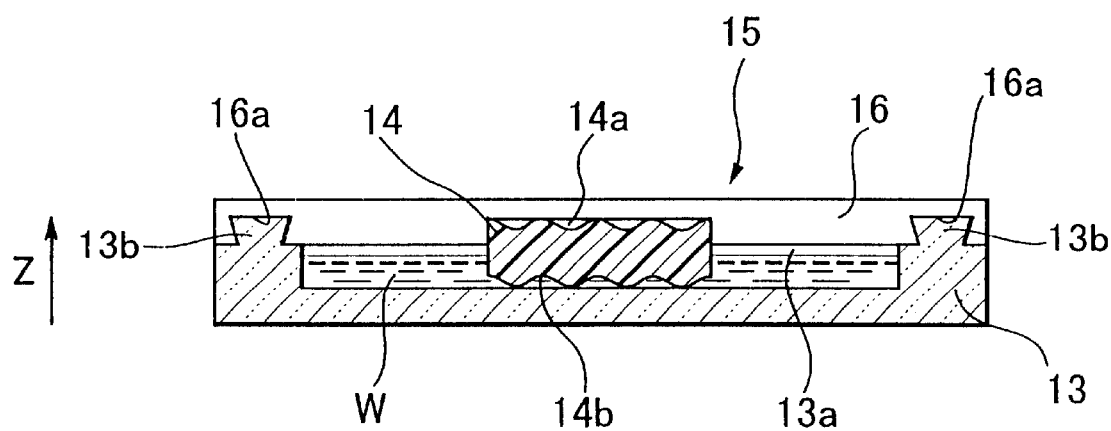
FIG. 3 is a cross-sectional view along 3—3 line in FIG. 2.

FIG. 2 is a partial plan view schematically showing the base 13 holding the image carrier 14 in the image carrier receiving portion 13a. FIG. 3 is a cross-sectional view taken along 3—3 line in FIG. 2.

As shown in FIGS. 1–3, the micro-plate 14 is plate like member made of transparent material such as plastic. The top surface of the micro-plate 14 is formed with a plurality of wells 14a, 14a, 14a . . . for holding liquid specimens labeled with fluorescent dye. The bottom surface of the micro-plate 14 is formed with a plurality of recesses or grooves 14b complementary to the wells 14a, 14a. Therefore, when the micro-plate 14 is received in the image carrier receiving portion 13a, spaces or gaps are formed between the floor of the image carrier receiving portion 13a and the bottom of the micro-plate 14 formed with the recesses or grooves 14b.

The image carrier receiving portion 13a is filled with sufficient water to fill spaces or gaps between the floor of the image carrier receiving portion 13a and the bottom of the micro-plate 14 when the micro-plate 14 is received in the image carrier receiving portion 13a. Therefore, when the micro-plate 14 is placed in the image carrier receiving portion 13a, the spaces or gaps between the floor of the base 13 and the bottom surface of the micro-plate 14 are filled with water.

Retaining means 15 for fixing the micro-plate 14 in the image carrier receiving portion 13a by pressing opposite ends of the micro-plate 14 downward, is provided on the base 13. As shown in FIGS. 2 and 3, the retaining means 15 comprises a pair of retaining members 16,16. Each retaining member 16 has cutouts 16a, 16a at opposite ends thereof The cutouts 16a have a cross-section complementary to that of guide rails 13b formed on longitudinally opposite ends of the base 13. The retaining member 16 is constructed so as to slide along the opposite edges of the base 13 with the cutouts 16a fitted into the guide rails 13b. A stepped portion 16b is formed by rectangularly cutting away a lower portion of the holding member 16 at its inward edge. The stepped portion 16b of each retaining member 16 has a size and shape enabling its to downwardly and inwardly engage one of the opposite ends of the micro-plate 14 received in the image carrier receiving portion 13a. Thus, in this embodiment, the retaining means 15 is constructed so as to fix the micro-plate 14 by outwardly sliding the retaining members 16, 16 to define a space wider than the width of the micro-plate 14, placing the micro-plate 14 on the image carrier receiving portion 13a between the retaining members 16, 16, and finally sliding the holding members 16, 16 inwardly to engage their stepped portions 16b, 16b with the upper portion of the opposite ends of the micro-plate 14 and press the micro-plate 14 downwardly.

Figure 4:
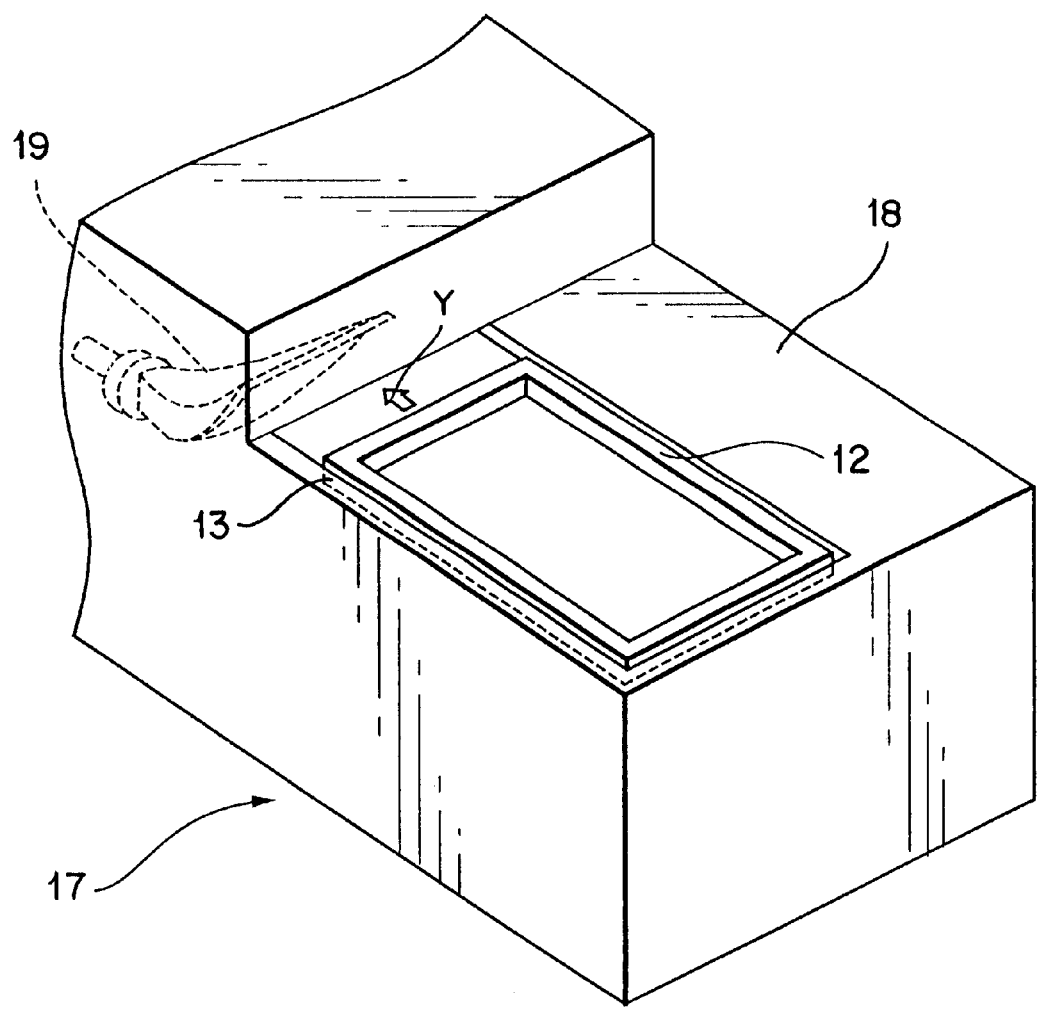
FIG. 4 is a schematic perspective view showing the exterior of an image reading apparatus which is an embodiment of the present invention.

FIG. 4 is a schematic perspective view showing the exterior of an image reading apparatus which is an embodiment of the present invention.

As shown in FIG. 4, the image reading apparatus 17 includes a sample stage 18 on which the image carrier unit 12 is set. The image carrier unit 12 is conveyed by a conveyance mechanism (not shown) in a direction indicated by Z in FIG. 3 and is located at a predetermined position in the image reading apparatus 17 to be scanned with the laser beam 4.

The image carrier unit 12 is conveyed by a motor (not show) in a direction of the arrow Y. namely the sub-scanning direction in FIG. 1 in synchronism with the scanning with the laser beam 4 in the main scanning direction so that the whole surface of the micro-plate 14 facing to the base 13 is scanned by the laser beam 4.

Upon irradiated with the laser beam 4, the fluorescent dye contained in the specimens received in the wells 14a, 14a . . . of the micro-plate 14 is excited and releases fluorescent light. The fluorescent light released from the fluorescent dye enters a light guide 19 positioned in the vicinity of the base 13 so as to face the scanning line of the base 13.

The light receiving end of the light guide 19 has a linear shape and exit end thereof is disposed close to a light receiving surface of a light detector 20 such as a photo multiplier for photoelectrically detecting light. This light guide 19 is made by processing non-fluorescent glass or the like and so constructed that fluorescent light introduced from the light receiving end is transmitted to the exit end under repeated total reflection within the light guide 19 and received by the light receiving surface of the light detector 20 via the exit end.

Therefore, the fluorescent light emitted from the fluorescent dye contained in the specimens received in the wells 14a, 14a . . . of the micro-plate 14 upon being irradiated with the laser beam 4 enters the light guide 19 and is received by the light detector 20 via the exit end under repeated total reflection within the light guide 19.

Figure 5:
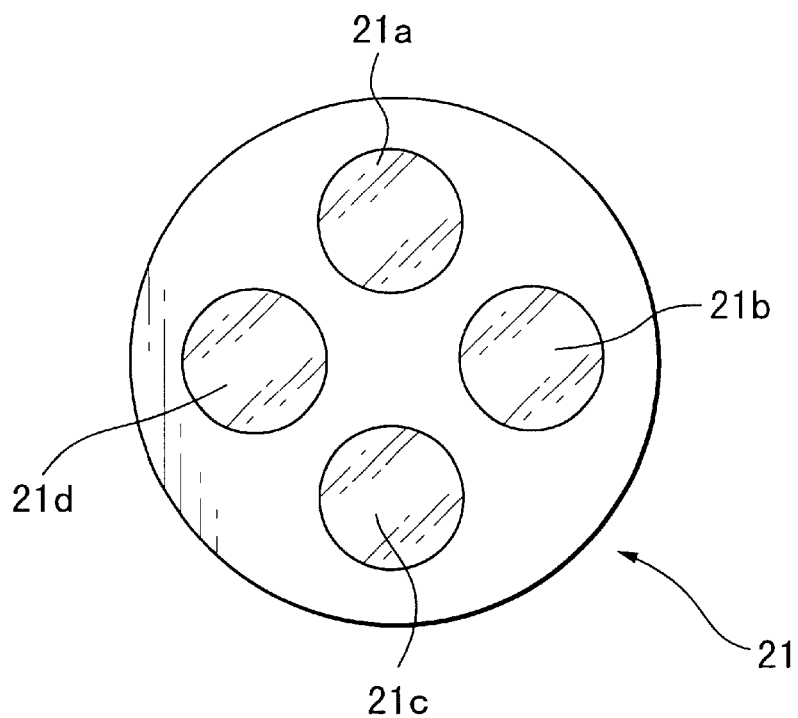
FIG. 5 is a schematic front view showing a filter member.

In front of the light receiving surface of the light detector 20 is provided a filter member 21. FIG. 5 is a schematic front view of the filter member 21. The filter member 21 is constituted by rotatable disk provided with four filters 21a, 21b, 21c and 21d. The filter 21a is used for reading fluorescent light released from the fluorescent dye contained in the specimens received in the wells 14a, 14a . . . of the micro-plate 14 upon being excited using the first laser stimulating ray source 1 and has a property to cut off light having a wavelength of 633 nm but transmit light having a wavelength longer than 633 nm. The filter 21b is used for reading fluorescent light released from the fluorescent dye contained in the specimens received in the wells 14a, 14a . . . of the micro-plate 14 upon being excited using the second laser stimulating ray source 2 and has a property to cut off light having a wavelength of 532 nm but transmit light having a wavelength longer than 532 nm. The filter 21c is used for reading fluorescent light released from the fluorescent dye contained in the specimens received in the wells 14a, 14a . . . of the micro-plate 14 upon being excited using the third laser stimulating ray source 3 and has a property to cut off light having a wavelength of 473 nm but transmit light having a wavelength longer than 473 nm. The filter 21d is used for reading stimulated emission released from the stimulable phosphor contained in the stimulable phosphor layer formed on the stimulable phosphor sheet is excited using the first laser stimulating ray source 1 and has a property to allow only light of a wavelength region of the stimulated emission released from the stimulable phosphor to pass through and cuts off light having a wavelength of 633 nm. Therefore, in accordance with the laser stimulating ray source to be employed, namely, the kind of fluorescent dye and the kind of the image carrier in other words, whether the image carrier is a stimulable phosphor sheet or not, the light detector can be photoelectrically detect only light to be detected by selectively employing the filters 21a, 21b, 21c and 21d. The filter member 21 can be rotated by a motor 22. A photomultiplier containing a bialkali material based on the compound $K_2$ CsSb prepared by activation with oxygen and cesium is used as the light detector 20.

The light photoelectrically detected by the light detector 20 is converted to an electrical signal, amplified by an amplifier 23 having a predetermined amplifying factor so as to produce an electrical signal of a predetermined level and then input to an A/D converter 24. The electrical signal is converted in the A/D converter 24 to a digital signal with a scale factor suitable for the signal fluctuation width and input to a line buffer 25. The line buffer 25 temporarily stores image data corresponding to one scanning line. When the image data corresponding to one scanning line have been stored in the line buffer 25 in the above described manner, the line buffer 25 outputs the data to a transmitting buffer 26 whose capacity is greater than that of the line buffer 25 and when the transmitting buffer 26 has stored a predetermined amount of the image data, it outputs the image data to an image processing apparatus 27. The image data input to the image processing apparatus 27 are stored in an image data storing means (not shown). The image data are read out from the image data storing means, image-processed as occasion demands and displayed on display means such as a CRT (not shown) as a visual image or analyzed by an image analyzing apparatus (not shown).

The image reading apparatus further comprises the control unit 28 and input means 29 including a keyboard. When reading of a fluorescent image constituted by the fluorescent dye contained in the specimen received in the wells 14a, 14a . . . of the micro-plate 14 is to be performed, the operator input the kind of the fluorescent dye used for labeling the specimen received in the wells 14a, 14a. . . of the micro-plate 14 via the input means 29. On the other hand, when the reading of a radiation image recorded in the stimulable phosphor layer formed on the stimulable phosphor sheet is to be performed, the operator input that image reading from a stimulable phosphor sheet is to be performed to the input means 29. In response to the input by the operator, the laser stimulating ray source 1, 2 or 3 to be used and the filter 21a, 21b, 21c and 21d to be selected is automatically selected and the image reading is started. That is, when the kind of the fluorescent dye is input via the input means 29, motor 22 is driven to rotate the filter member 21 and to position one of the filters 21a, 21b, 21c or 21d corresponding to the kind of the fluorescent dye contained in the specimen received in the wells 14a, 14a. . . of the micro-plate 14 in front of the light detector 20 and one of the laser stimulating ray source 1, 2 or 3 is selectively driven to radiate the laser beam 4 by the control unit 28 for starting image reading. On the other hand, when the operator input that the image reading from a stimulable phosphor sheet is to be performed, the control unit 28 drives the motor 22 to rotate the filter member 21 so as to position the filter 21d in front of the light detector 20 and drive the first laser stimulating ray source 1 to emit the laser beam 4 for starting the image reading.

In this embodiment, the liquid specimens in the wells 14a, 14a . . . of the micro-plate 14 are labeled with Fluorescein, which is most efficiently excited by a light having a wavelength of 490 nm, and release fluorescent light having an intensity proportional to the amount of Fluorescein contained therein Accordingly, upon the operation of the third laser stimulating ray source 3, the fluorescent images of the fluorescent dye contained in the liquid specimens held in the wells 14a, 14a . . . of the micro-plate 14 can be read and quantitatively analyzed.

Image reading of fluorescent images constituted by the liquid specimens labeled with Fluorescein and received in the wells 14a, 14a . . . of the micro-plate 14 is performed as follows. First, the retaining members 16,16 are outwardly slid to form a space wider than the width of the micro-plate 14 therebetween, with the image carrier receiving portion 13 filled with sufficient water W to fill the spaces formed between the bottom surface of the micro-plate 14 and the floor of the base 13 (i.e. the floor of the image carrier receiving portion 13a). Then, the micro-plate 14 is placed in the image carrier receiving portion 13a between the retaining members 16, 16. Then, the retaining members 16, 16 are inwardly slid to engage their stepped portions 16b, 16b with the upper portion of the opposite ends of the micro-plate 14 and to press the micro-plate 14 downwardly. Thus, micro-plate 14 is fixed by engagement of its opposite ends with the retaining members 16, 16. Thus, the retaining members 16, 16 prevent the micro-plate 14 from floating in the water or being moved by the water.

Then, the image carrier unit 12 is set on the sample stage 18 in the image reading apparatus 17 and conveyed to the position shown in FIG. 1, Fluorescein is then designated as the kind of fluorescent dye via the input means 29.

When Fluorescein is designated as the kind of fluorescent substance, the control unit 28 outputs a drive signal to the motor 22 to rotate the filter member 21 so that the filter 21c is positioned in front of the light detector 20 and activates the third laser stimulating ray source 3. As a result, a laser beam 4 having a wavelength of 473 nm is emitted from the third laser stimulating ray source 3. The laser beam 4 is reflected by the dichroic mirror 7 and the beam diameter thereof is accurately adjusted by the beam expander 8. The laser beam 4 impinges upon and is deflected by the polygon mirror 9. The beam deflected by the polygon mirror 9 passes through the fθ lens 10 and is reflected by the mirror 11. The laser beam 4 reflected by the mirror 11 passes through the transparent base 13 and the water W filling the space between the base 13 made of glass and the bottom surface of the micro-plate 14 and advances toward the bottom surface of the micro-plate 14.

Water has a refractive index closer to that of the transparent material constituting the micro-plate 14 than that of air. Therefore, the refraction of the laser beam which enters from the glass base 13 into water W is smaller than refraction of the laser beam which enters from the glass base 13 into air and change in the light path and change in the beam diameter are reduced. As a result, it is possible to minimize the shift of the irradiating point owing to change in the light path caused by the uneven thickness of the spaces between the micro-plate 14 and the base 13 and to minimize the dispersion of the change in irradiating power caused by variation in beam diameter among the liquid specimens in the wells 14a, 14a . . . of the micro-plate 14.

The laser beam 4 enters the bottom surface of the micro-plate 14 after passing through the water W and reaches the specimens held in the wells 14a of the micro-plate 14. Since the laser beam 4 is scanned on the bottom surface of the micro-plate 14 by the rotation of the polygon mirror 9 in the main scanning direction indicated by X in FIG. 1, while the image carrier unit 12 is moved in the sub-scanning direction indicated by Y in FIG. 1, the whole surface of the micro-plate 14 facing the base 13 is scanned with the laser beam 4 having a wavelength of 473 nm. As a result, the Fluorescein contained in the liquid specimen held in wells 14a of the micro-plate 14 is excited and releases fluorescent light having a peak wavelength of 530 nm.

At each well, the Fluorescent light released by the Fluorescein, the fluorescent dye contained in the specimens held in the wells 14a of the micro-plate 14, passes through the bottom portion of the well 14a of the micro-plate 14 made of transparent material and enters the water W filling the spaces between the base 13 and the bottom surface of the micro-plate 14, advances toward the transparent base 13 made of glass and finally enters the transparent base of glass.

Water has a refractive index closer to that of the transparent material constituting the micro-plate 14 than that of air. Therefore, the refraction of the fluorescent light which enters the water W from the micro-plate 14 is smaller than the refraction of the fluorescent light which enters air from the micro-plate 14 and the variation in the distance between the positions where the fluorescent light is released and the positions where the fluorescent light enters the surface of the base 13 is reduced. Therefore, despite the uneven thickness of the gaps between the micro-plate 14 and base 13, it is possible to minimize the variation in distance between the positions where the fluorescent light is released and the positions where the fluorescent light enters the base 13 caused by the uneven thickness of the gaps among liquid specimens in the wells 14a of the micro-plate 14.

The fluorescent light entering the base 13 passes through the base 13 and enters the light guide 19 which is closely positioned so as to be faced to the scanning line on the base 13. The fluorescent light introduced into the light guide 19 is transmitted to the exit end under repeated total reflection within the light guide and impinges on the filter 12c. Since the filter 21c has a property to cut light having a wavelength of 473 nm and to transmit light having a wavelength longer than 473 nm and the wavelength of the fluorescent light released from the Fluorescein is longer than the wavelength of the stimulating ray, only fluorescent light released from the Fluorescein is introduced into and photoelectrically detected by the light detector 20 and amplified by the amplifier 23 to an electrical signal having a predetermined level. The electrical signal is then converted by the A/D converter 24 to a digital signal with a scale factor suitable for the signal function width and is stored in the line buffer 25. When the image data corresponding to one scanning line have been stored in the line buffer 25, the line buffer 25 outputs the data to a transmitting buffer 26.

The image data obtained by detecting the fluorescent light released from the Fluorescein contained in the liquid specimens in the wells 14a, 14a of the micro-plate 14 are output from the transmitting buffer 25 to the image processing apparatus 27 and fluorescent images each consisting of a density pattern corresponding to the quantity of Fluorescein contained in the liquid specimen in the associated well 14a of the micro-plate 14 is displayed on a display means such as a CRT display as a visible image. The image data produced in the above described manner are stored in an image storing means (not shown) or are analyzed by an image analyzing apparatus (not shown) as occasion demands.

Since the image reading apparatus 17 according to this embodiment further comprises the second laser stimulating ray source 2 for emitting a laser beam having a wavelength of 532 nm, the image formed by liquid specimens labeled by a fluorescent substance efficiently stimulable with laser beam having a wavelength of 532 nm, such as Rhodamine B or the like, can be read. Specifically, when the liquid specimens labeled with Rhodamine B are received in the wells 14a, 14a of the micro-plate 14, Rhodamine B is input as a kind of the fluorescent substance via the input means 29. The motor 22 is driven by the drive signal from the control unit 28 such that the filter 21b is positioned in front of the light detector 20. Then. the second laser stimulating ray source 2 is activated and Rhodamine B contained in the liquid specimens received in the wells 14a, 14a of the micro-plate 14 is excited and fluorescent light having a peak wavelength of 605 nm is released from Rhodamine B. The fluorescent light released from Rhodamine B passes through the filter 21b and is photoelectrically detected by the light detector 20 and image data are produced in the same manner as the image reading from Fluorescein.

Since the image reading apparatus 17 according to this embodiment further comprises the first laser stimulating ray source 1 for emitting a laser beam having a wavelength of 633 nm, the image formed by liquid specimens labeled by a fluorescent substance efficiently stimulable with laser beam having a wavelength of 633 nm, such as CY-5 or the like, can be read. Specifically, when the liquid specimens labeled with CY-5 are received in the wells 14a, 14a of the micro-plate 14, CY-5 is input as a kind of the fluorescent substance via the input means 29. The motor 22 is driven by the drive signal from the control unit 28 such that the filter 21a is positioned in front of the light detector 20. Then. the first laser stimulating ray source 1 is activated and CY-5 contained in the liquid specimens received in the wells 14a, 14a of the micro-plate 14 is excited and fluorescent light having a peak wavelength of 667 nm is released from CY-5. The fluorescent light released from CY-5 passes through the filter 21a and is photoelectrically detected by the light detector 20 and image data are produced in the same manner as the image reading from Fluorescein.

The image reading apparatus 17 according to this embodiment is constituted so as to be able to read not only fluorescent images carried on a micro-plate 14 but also an electrophoresis image of fluorescent dye recorded in a gel support prepared by, for example, electrophoresing a plurality of DNA fragments after a fluorescent dye was added to a solution containing a plurality of DNA fragments to be electrophoresed. In the image reading apparatus 17, the stepped portions 16b formed on the retaining members 16 of the holding means 15 are constituted so as to be engageable with the opposite ends of the gel support (not shown) and, therefore it is possible to place and hold the gel support on the base 13 in place of the micro-plate 14. In the image reading from the gel support using the image reading apparatus 17, the gel support is fixed in the image carrier receiving portion 13a by the retaining means 15 and the gaps between the base 13 and the image carrier, which is a gel support in this case, are filled with water as in the case of reading of fluorescent images carried on the micro-plate 14. Then, the first laser stimulating ray source 1, the second laser stimulating ray source 2, or the third laser stimulating ray source 3 and filter 21a, filter 21b or filter 21c are selectively used depending on the kind of the fluorescent dye to be excited. The released fluorescent light is photoelectrically detected by the light detector 20 to read the electrophoresis image of the fluorescent dye and image data are produced.

In this image reading, the fluorescent stimulating ray passes through the water W and enters base 13. A difference in the refractive index between the gel support and the water W is smaller than that between the gel support and air. Therefore, even if the bottom surface of the gel support contacting the base 13 is not completely flattened and the gaps between the bottom surface of the gel support and the base are not uniform, it is still possible to minimize the variation in distance between the positions to be irradiated and the positions actually irradiated in the same gel support.

Figure 6:
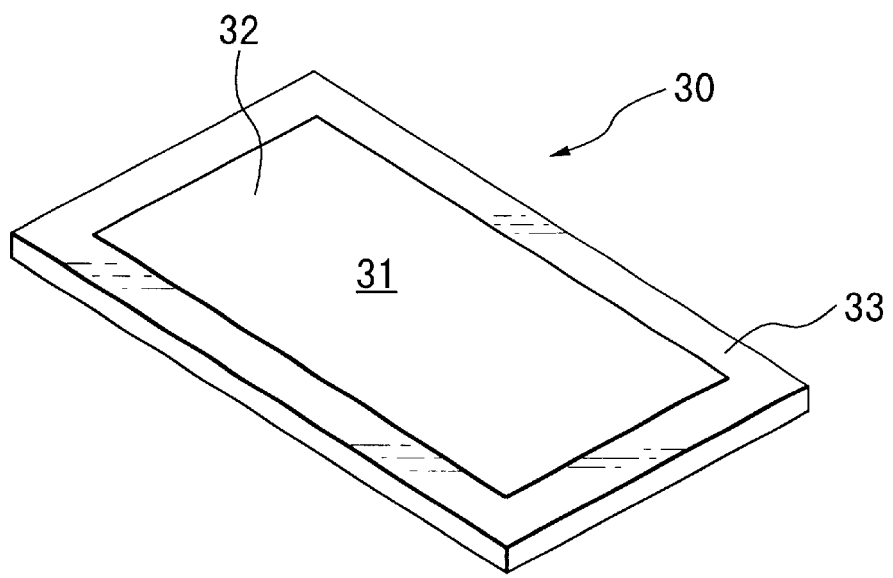
FIG. 6 is a schematic perspective view showing a stimulable phosphor sheet unit.

The image reading apparatus 17 according to this embodiment is constituted so as to be able to read not only a fluorescent image but also a radiation image recorded in the stimulable phosphor sheet. FIG. 6 shows a schematic perspective view showing a stimulable phosphor sheet unit 30.

When the radiation image recorded in the stimulable phosphor layer formed on the stimulable phosphor sheet 32 is to be read, the stimulable phosphor sheet unit 30 is set on the sample stage 18 instead of image carrier unit 12. As shown in FIG. 6, a stimulable phosphor sheet unit 30 includes a stimulable phosphor sheet 32 formed with a stimulable phosphor layer 31 on one surface thereof and magnetic layer (not shown) on the other surface thereof and a support plate 33 such as a aluminum plate onto which gum-like magnetic sheet (not shown) is adhered on one surface thereof The magnetic layer of the stimulable phosphor sheet 32 and the magnetic sheet of the support plate 33 are adhered by magnetic force and the stimulable phosphor sheet 32 is integrated with the support plate 33.

In this embodiment, the stimulable phosphor layer 31 formed on the stimulable phosphor sheet 32 records a radiation image of the radioactively labeled substance contained in the gene prepared by using the Southern blot hybridization method. The radiation image of the radioactively labeled substance in the gene is stored in the stimulable phosphor layer 31 of the stimulable phosphor sheet 32, for example, in the following manner. First, a plurality of DNA fragments containing the target gene are separated and distributed on a gel support medium by means of electrophoresis and denatured by alkali processing to form single-strained DNA Then, according to the known Southern blotting method, the gel support and a transfer support such as a nitrocellulose filter are placed in layers to transfer at least a part of the denatured DNA onto the transfer support and the transferred DNA fragments are fixed on the transfer support by heating or UV radiation. Further, probes prepared by radioactively labeling DNA or RNA which is complementary to the DNA containing target gene and the denatured DNA fragments are hybridized by heating to form double-stranded DNA fragments or combined DNA and RNA Since the denatured DNA fragments are fixed on the transfer support at this time, only the DNA fragments which are complementary to the probe DNA or probe RNA are hybridized to acquire the radioactively labeled probe. Then, the probe which have not formed hybrids are removed by washing with proper solution and only the DNA fragments having a target gene form the hybrids with the radioactively labeled DNA or RNA on the transfer support to be radioactively labeled. The transfer support thus produced and the stimulable phosphor layer 31 of the stimulable phosphor sheet 32 are stacked for a certain period of time to expose the stimulable phosphor layer 31 and at least a part of the radiation emitted from the radioactively labeled substance on the transfer support is absorbed in the stimulable phosphor layer 31 formed on the stimulable phosphor sheet 32, whereby the radiation image regarding to the radioactively labeled substance in the specimen is stored in the form of an image in the stimulable phosphor layer 31.

When the radiation image regarding a radioactively labeled substance contained in a gene prepared by using the Southern blot hybridization method and recorded in the stimulable phosphor layer 31 formed on the stimulable phosphor sheet 32 is to be read, the operator first sets the stimulable phosphor sheet unit 30 on the sample stage 18 of the image reading apparatus 17 so that the stimulable phosphor layer 31 is downwardly directed and then the stimulable phosphor sheet unit 30 is moved to a position where the image carrier unit 12 is located in FIG. 1. Simultaneously, the operator inputs an instruction through the input means 29 so that the image carrier is a stimulable phosphor sheet 32. In accordance with the instruction signal input through the input means 29, the control unit 29 outputs a drive signal to the motor 22 to rotate the filter member 21 so that the filter 21d is positioned in front of the light receiving surface of the light detector 20. The control unit 28 then activates the first laser stimulating ray source 1. As a result, a laser beam 4 having a wavelength of 633 nm is emitted from the first laser stimulating ray source 1 and passes through the dichroic mirrors 6, 7 and after the beam diameter of the laser beam 4 has been accurately adjusted by the beam expander 8, the laser beam 4 impinges on the polygon mirror 9. The laser beam 4 deflected by the polygon mirror 9 passes through the fθ lens 10 and impinges on and is reflected by mirror 11, thereby entering the stimulable phosphor layer 31 formed on the stimulable phosphor sheet 32. Since the laser beam 4 is scanned on the stimulable phosphor layer 31 formed on the stimulable phosphor sheet 32 in the main scanning direction indicated by X in FIG. 1, while the stimulable phosphor sheet unit 30 is moved in sub-scanning direction indicated by Y in FIG. 1, the whole surface of the stimulable phosphor layer 31 formed on the stimulable phosphor sheet 32 is scanned with the laser beam 4.

When the stimulable phosphor layer 31 is scanned with the laser beam 4 having a wavelength of 633 nm in this manner, the stimulable phosphor contained in the stimulable phosphor layer 31 formed on the stimulable phosphor sheet 31 is excited, thereby releasing stimulating emission.

The stimulating emission released from the stimulable phosphor enters the light guide 19 and passes through the filter 21d via the exit end of the light guide 19 under repeated total reflection within the light guide 19. Since the filter 21d has a property to allow only light of the wavelength region of the stimulated emission released from the stimulable phosphor to pass through and cut off light having a wavelength of 633 nm, only the stimulated emission released from. the stimulable phosphor is photoelectrically detected by the light detector 20. The electrical signal generated by the light detector 20 is amplified by the amplifier 23 so as to produce an electrical signal of a predetermined level and then converted in the A/D converter 24 to a digital signal with a scale factor for the signal fluctuation width. The digital signal is further forwarded to the image processing apparatus 27 via the line buffer 25 and the transmitting buffer 26. A visual image is displayed on a display means such as a CRT based on image data inputs to the image processing apparatus 27. The image data thus produced are stored in the image data storing means (not shown) or analyzed by the image analyzing apparatus (not shown) as occasion demands.

According to the above described embodiment, since the gaps between the image carrier 14 carrying the fluorescent image e.g. a micro-plate 14 or gel support (not shown), and the base 13 are filled with water, whose refractive index is larger than that of air, and the image carrier 14 is upwardly scanned from the bottom side thereof and the fluorescent light released from the fluorescent substance contained in the image carrier 14 is detected through the base 13, the stimulating ray projected onto the micro-plate 14 or gel support passes through the water, whose refractive index is closer to that of the micro-plate 14 or gel support than that of air. Therefore, the refraction of the stimulating ray at the boundary between the base or image carrier and the water becomes smaller than that at the boundary between the base or image carrier and air. As a result, even if the gaps between the micro-plate 14 and the base 13 are not uniform or if the bottom surface of the gel support contacting the base 13 is not completely flattened and the gaps between the bottom surface of the gel support and the base are not uniform, it is still possible to minimize the variation in distance between the positions to be irradiated and the positions actually irradiated in the same image carrier.

Further, according to this embodiment, since the opposite ends of the image carrier e.g. micro-plate 14 or gel support, are fixed by the retaining members 16,16 of the retaining means 15, the image carrier (micro-plate 14 or gel support) can be fixed in the image carrier receiving portion 13a to achieve image reading despite the presence of the water in the image carrier receiving portion 13a, thereby preventing the degradation of accuracy in image reading.

Moreover, the image reading apparatus 17 according to the above described embodiment can read both a fluorescent image of a fluorescent substance carried on the micro-plate 14 or gel support and a radiation image recorded on the stimulable phosphor layer 31 formed on the stimulable phosphor sheet 32. Therefore, efficiency is high The present invention has thus been shown and described with reference to specific embodiments. However, it should be noted that the present invention is no way limited to the details of the described arrangements but changes and modifications may be made without departing from the scope of the claimed invention.

For example, in the above described embodiment, the micro-plate 14 or gel support is scanned by the laser beam 4 through the base 13 with the image carrier receiving portion 13a of the image carrier unit 12 containing water and the gaps (recesses 14b) between the micro-plate 14 and the base 13 or between the bottom surface of the gel support and the base 13 filled with the water. However, the substance for filling the gaps (recesses 14b) between the micro-plate 14 and the base 13 or between the bottom surface of the gel support and the base 13 is not limited to water but can be any substance which is capable of filling the gaps (recesses 14b) between the micro-plate 14 and the base 13 or between the bottom surface of the gel support and the base 13 and which has a larger refractive index than that of air. For example, cedar oil, or any of various aqueous solutions or other liquids can be used.

Further, in the above description, although image reading from liquid specimens labeled with a fluorescent substance and held in the wells 14a, 14a . . . of the micro-plate 14 is described, image reading from solid specimens labeled with a fluorescent substance and held in the wells 14a, 14a . . . of the micro-plate 14 can also be performed according to the present invention Furthermore, in the above described embodiment, the image reading apparatus 17 comprises the first laser stimulating ray source 1 for emitting a laser beam having a wavelength of 633 nm, the second laser stimulating ray source 2 for emitting a laser beam having a wavelength of 532 nm and the third laser stimulating ray source 3 for emitting a laser beam having a wavelength of 473 nm. However, it is not necessary for the image reading apparatus to include three laser stimulating ray sources. The image reading apparatus may include at least one laser stimulating ray source depending on the kind of the fluorescent substance forming the fluorescent image to be read.

Moreover, the image reading apparatus 17 of the above described embodiment is constituted so as to be able to read the radiation image recorded in the stimulable phosphor layer 31 formed in the stimulable phosphor sheet 32 in addition to the fluorescent image. However, it is not necessary for the image reading apparatus of the present invention to be thus constructed.

Further, in the above described embodiment, although the He—Ne laser is used as the first laser stimulating ray source 1 for emitting a laser beam 4 having a wavelength of 633 nm, a semiconductor laser source for emitting a laser beam having a wavelength of 635 nm may be employed instead of the He—Ne laser.

Further, in the above described embodiment, the laser stimulating ray source comprises a laser stimulating ray source for emitting a laser beam having a wavelength from 470 nm to 480 nm.

Further, in the above described embodiment, the laser stimulating ray source comprises a laser stimulating ray source for emitting a laser beam having a wavelength of 633 nm or 635 nm.

Further, in the above described embodiment, the laser stimulating ray source comprises a laser stimulating ray source for emitting a laser beam having a wavelength of from 530 nm to 540 nm.

Furthermore, m the above described embodiment, although the laser beam source for emitting a laser beam having a wavelength of 633 nm, the laser beam source for emitting a laser beam having a wavelength of 532 nm and the laser beam source for emitting a laser beam having a wavelength of 473 nm are respectively used as the first laser stimulating ray source 1, the second laser stimulating ray source 2 and the third laser stimulating ray source 3, a laser beam source for emitting a laser beam having a wavelength of 635 nm may be used for the first laser stimulating ray source 1 instead of the laser beam source for emitting a laser beam 4 having a wavelength of 633 nm and a laser beam source for emitting a laser beam having a wavelength of from 530 nm to 540 nm and a laser beam source for emitting a laser beam 4 having a wavelength from 470 nm to 480 nm may be used for the second laser stimulating ray source 2 and the third laser stimulating ray source 3, respectively.

Moreover, in the above described embodiments, although the light guide 29 made by processing a non-fluorescent glass or the like is employed, the light guide 29 is not limited to one made of a non-fluorescent glass but a light guide made by processing synthesized crystal, a transparent sheet such as an acrylic synthetic resin sheet or the like may be used.

Further, in the above described embodiment, when a fluorescent image recorded in the micro-plate 14 or gel support is to be read, the kind of the fluorescent dye is input through the input means 29 and when a radiation image recorded in the stimulable phosphor layer formed on the stimulable phosphor sheet 32 is to be read, an instruction that the image carrier is a stimulable phosphor sheet is input through the input means 29, whereby the control unit 28 automatically selects one of the laser stimulating ray sources 1, 2 and 3, and one of the filters 21a, 21b, 21c and 21d. However, the kinds of instruction signals for causing the control unit 28 to effect such automatic selection can be arbitrarily determined and it is not necessary to input the kinds fluorescent dye or that the image carrier is a stimulable phosphor sheet.

What is claimed is:

1. An image reading apparatus comprising:
   at least one laser stimulating ray source for emitting a laser beam,
   a base made of transparent material and bearing thereon an image carrier which carries a fluorescence image formed by a fluorescent substance which can be excited and can release a fluorescent light in response to irradiation by the laser beam,
   a laser beam scanning means for upwardly scanning a bottom surface of the image carrier borne on the base with the laser beam emitted from the laser stimulating ray source through the transparent material of the base,
   light detecting means provided below the base for photoelectrically detecting fluorescent light released from the image carrier, and
   an image carrier receiving portion provided on the base and containing a substance having a refractive index larger than that of air and closer to that of the image carrier than that of air, the substance filling gaps between the image carrier and the base.

2. An image reading apparatus in accordance with claim 1, wherein said substance having the refractive index larger than that of air and closer to that of the image carrier than that of air, is a liquid.

3. An image reading apparatus in accordance with claim 1, wherein said substance having the refractive index larger than that of air, is water.

4. An image reading apparatus in accordance with claim 1, wherein said image carrier comprises a micro-plate made of transparent material and having a plurality of wells for receiving specimens labeled with a fluorescent substance.

5. An image reading apparatus in accordance with claim 1, wherein said image carrier comprises a gel support including a specimen labeled with a fluorescent substance.

6. An image reading apparatus in accordance with claim 1, wherein said base is provided with retaining means for fixing the image carrier.

7. An image reading apparatus in accordance with claim 1, wherein said at least one laser stimulating ray source is a laser stimulating ray source for emitting a laser beam having a wavelength between 470 nm and 480 nm.

8. An image reading apparatus in accordance with claim 1, wherein said at least one laser stimulating ray source is a laser stimulating ray source for emitting a laser beam having a wavelength of one of 633 nm and 635 nm.

9. An image reading apparatus in accordance with claim 1, wherein said at least one laser stimulating ray source is a laser stimulating ray source for emitting a laser beam having a wavelength between 530 nm and 540 nm.

10. An image reading apparatus in accordance with claim 2, wherein said image carrier comprises a micro-plate made of transparent material and having a plurality of wells for receiving specimens labeled with a fluorescent substance.

11. An image reading apparatus in accordance with claim 10, wherein said base is provided with retaining means for fixing the image carrier.

12. An image reading apparatus in accordance with claim 11, wherein said at least one laser stimulating ray source is a laser stimulating ray source for emitting a laser beam having a wavelength between 470 nm and 480 nm.

13. An image reading apparatus in accordance with claim 11, wherein said at least one laser stimulating ray source is a laser stimulating ray source for emitting a laser beam having a wavelength of one of 633 nm and 635 nm.

14. An image reading apparatus in accordance with claim 11, wherein said at least one laser stimulating ray source is a laser stimulating ray source for emitting a laser beam having a wavelength between 530 nm and 540 nm.

15. An image reading apparatus in accordance with claim 12, wherein said at least one laser stimulating ray source is a laser stimulating ray source for emitting a laser beam having a wavelength of one of 633 nm and 635 nm.

16. An image reading apparatus in accordance with claim 12, wherein said at least one laser stimulating ray source is a laser stimulating ray source for emitting a laser beam having a wavelength between 530 nm and 540 nm.

17. An image reading apparatus in accordance with claim 15, wherein said at least one laser stimulating ray source is a laser stimulating ray source for emitting a laser beam having a wavelength between 530 nm and 540 nm.

18. An image reading apparatus in accordance with claim 2, wherein said image carrier comprises a gel support including a specimen labeled with a fluorescent substance.

19. An image reading apparatus in accordance with claim 18, wherein said base is provided with retaining means for fixing the image carrier.

20. An image reading apparatus in accordance with claim 19, wherein said at least one laser stimulating ray source is a laser stimulating ray source for emitting a laser beam having a wavelength between 470 nm and 480 nm.

21. An image reading apparatus in accordance with claim 19, wherein said at least one laser stimulating ray source is a laser stimulating ray source for emitting a laser beam having a wavelength of one of 633 nm and 635 nm.

22. An image reading apparatus in accordance with claim 19, wherein said at least one laser stimulating ray source is a laser stimulating ray source for emitting a laser beam having a wavelength between 530 nm and 540 nm.

* * * * *